(12) United States Patent
Bex et al.

(10) Patent No.: US 9,517,752 B2
(45) Date of Patent: Dec. 13, 2016

(54) WIPER BLADE ADAPTER UNIT

(75) Inventors: Koen Bex, Jeuk (BE); Dirk Herinckx, Linter (BE); Helmut Depondt, Kessel-Lo (BE)

(73) Assignee: Robert Bosch GmbH, Stuttgart (DE)

( * ) Notice: Subject to any disclaimer, the term of this patent is extended or adjusted under 35 U.S.C. 154(b) by 218 days.

(21) Appl. No.: 14/233,138

(22) PCT Filed: Jul. 6, 2012

(86) PCT No.: PCT/EP2012/063271
§ 371 (c)(1),
(2), (4) Date: Jan. 15, 2014

(87) PCT Pub. No.: WO2013/010823
PCT Pub. Date: Jan. 24, 2013

(65) Prior Publication Data
US 2014/0150199 A1 Jun. 5, 2014

(30) Foreign Application Priority Data
Jul. 15, 2011 (DE) .................. 10 2011 079 227

(51) Int. Cl.
*B60S 1/40* (2006.01)
*B60S 1/38* (2006.01)

(52) U.S. Cl.
CPC ............. *B60S 1/40* (2013.01); *B60S 1/3867* (2013.01); *B60S 1/4019* (2013.01); *B60S 1/4003* (2013.01);
(Continued)

(58) Field of Classification Search
CPC ..... B60S 1/4003; B60S 1/4006; B60S 1/4009; B60S 1/4012; B60S 2001/4029; B60S 2001/4032
(Continued)

(56) References Cited

U.S. PATENT DOCUMENTS 4,296,521 A * 10/1981 Mower ..................... B60S 1/40
15/250.32
4,327,458 A * 5/1982 Maiocco ............... B60S 1/4019
15/250.32
(Continued)

FOREIGN PATENT DOCUMENTS

CN 201116097 9/2008
EP 1911641 4/2008
(Continued)

OTHER PUBLICATIONS

International Search Report for Application No. PCT/EP2012/063271 dated Oct. 15, 2012 (2 pages).

*Primary Examiner* — Michael Jennings
(74) *Attorney, Agent, or Firm* — Michael Best & Friedrich LLP

(57) ABSTRACT

The invention relates to a wiper blade adapter unit for connecting a wiper blade (10) to a wiper arm adapter (12), comprising a main part (16) which receives an end (14) of the wiper arm adapter (12) in particular and which has a plateau (20) on the main part lower face (18). At least one region (22, 24, 26) is provided on the main part (16), said region being designed in a flexible manner for the purpose of a shape and/or tolerance compensation. The region (22) that is flexible for the purpose of a shape and/or tolerance compensation is arranged within the plateau (20).

19 Claims, 4 Drawing Sheets

(52) U.S. Cl.
CPC . *B60S 2001/4012* (2013.01); *B60S 2001/4029* (2013.01); *B60S 2001/4032* (2013.01)

(58) Field of Classification Search
USPC .......................................... 15/250.32, 250.44
See application file for complete search history.

(56) References Cited

U.S. PATENT DOCUMENTS

| | | | | |
|---|---|---|---|---|
| 5,136,748 | A * | 8/1992 | Naruke | B60S 1/4019 15/250.31 |
| 5,768,739 | A * | 6/1998 | Iso | B60S 1/4006 15/250.32 |
| 5,807,016 | A * | 9/1998 | Herring | B60S 1/40 15/250.31 |
| 6,658,690 | B1 * | 12/2003 | Westermann | B60S 1/4006 15/250.32 |
| 7,055,207 | B2 * | 6/2006 | Coughlin | B60S 1/4003 15/250.32 |
| 2004/0123414 | A1 * | 7/2004 | Lee | B60S 1/4003 15/250.32 |
| 2007/0017054 | A1 * | 1/2007 | Hussaini | B60S 1/4003 15/250.32 |
| 2011/0005020 | A1 * | 1/2011 | Koppen | B60S 1/4003 15/250.32 |
| 2013/0180072 | A1 * | 7/2013 | Boland | B60S 1/3801 15/250.32 |

FOREIGN PATENT DOCUMENTS

| | | | | |
|---|---|---|---|---|
| FR | | 2744082 | 8/1997 | |
| FR | | 2744082 A1 * | 8/1997 | ............ B60S 1/3801 |

* cited by examiner

WIPER BLADE ADAPTER UNIT

BACKGROUND OF THE INVENTION

A wiper blade adapter unit for connecting a wiper blade to a wiper arm adapter, comprising a main part which receives an end of the wiper arm adapter in particular and which has a plateau on the main part lower face, has already been disclosed.

SUMMARY OF THE INVENTION

The invention relates to a wiper blade adapter unit for connecting a wiper blade to a wiper arm adapter, comprising a main part which receives an end of the wiper arm adapter in particular and which has a plateau on the main part lower face. At least one region is provided on the main part, which region is designed in a flexible manner for the purpose of a shape and/or tolerance compensation.

According to the invention, the region that is flexible for the purpose of a shape and/or tolerance compensation is arranged within the plateau. In so doing, a configuration of the main part which is particularly advantageous by design can be achieved, wherein a particularly advantageous guidance or mounting of the wiper blade adapter can especially be achieved. "Wiper arm adapter" refers in this context particularly to an adapter which comprises a contact region for a wiper arm component and is provided to supply a coupling region of the wiper arm component for coupling and/or contacting to a wiper blade adapter. The wiper arm component can preferably be fastened to a wiper arm. A "wiper blade adapter" refers in this context particularly to an adapter which comprises a contact region for a wiper blade component and is undetachably connected to said wiper blade component when the wiper blade is dismantled from the wiper arm or at least in an operating state and is provided to supply a coupling region of the wiper blade component for a coupling and/or contacting to a wiper arm adapter. The term "provided" refers particularly to being specially designed and/or equipped. "Regions designed in a flexible manner" refer particularly to regions which are deflected by at least 0.5 mm from the neutral position thereof when force is applied during a properly executed assembly process and spring back into the neutral position thereof when the force is removed, for example during disassembly. In this regard, the regions designed in a flexible manner are preferably designed as one piece with the main part. By the term "as one piece", materially bonded with the main part, as, for example, by a welding process and/or a bonding process etc., is especially to be understood and in a particularly advantageous manner to be integrally formed with said main part by casting and/or by a single- or multi-component injection molding process. The term "plateau" refers particularly to an abutment surface which is situated higher than the remaining abutment surfaces of the main part in one direction. The "lower face of the main part" refers particularly to a face of the main part which faces a wiper blade in an assembled state. "Arranged within the plateau" particularly refers to the fact that the region designed in a flexible manner forms a portion of the abutment surface of the plateau or is introduced into the abutment surface of the plateau and/or is arranged within a plateau contour line that delimits the plateau when seen in a top view of said plateau.

The invention further proposes that the flexibly designed region arranged within the plateau is designed as a resilient lug. As a result, the flexible region can be particularly simply configured by design. A "resilient lug" refers particularly to an element which can be deflected by at least 0.5 mm from the neutral position thereof by applying a force during a properly executed assembly process and which springs back into the neutral position thereof after the force has been removed.

It is furthermore proposed that the region designed as a resilient lug has at least one abutment surface which forms a stop for a wiper arm adapter. As a result, stops for wiper arm adapters of various widths can be particularly advantageously provided. The term "stop for a wiper arm adapter" refers particularly to an abutment surface on which the wiper arm adapter rests in order to guide and position the same in the main part of the wiper blade adapter unit.

It is furthermore proposed that at least one second region designed in a flexible manner is arranged on the lower face of the main part in addition to the region arranged within the plateau. In so doing, the wiper arm adapter can be particularly advantageously and precisely fixed and guided.

In addition, it is proposed that the second region which is arranged on the lower face of the main part and designed in a flexible manner is embodied as a resilient lug, which projects above the plateau in a direction oriented away from an upper face of the main part. The region embodied as a resilient lug can form a particularly advantageous lateral stop for a wiper arm adapter. An "upper face of the main part" refers particularly to a face of said main part that faces away from the lower face of said main part, said upper face of the main part facing away from the wiper arm and facing the wiper arm adapter in particular in the assembled state.

It is furthermore proposed that the main part has an upper abutment surface on an upper face, into which a pocket extending substantially in a wiping direction is introduced. As a result, the main part can be designed particularly advantageously and with low weight. "Abutment surface" refers in this context particularly to a surface on which the wiper arm adapter rests in the assembled state.

It is furthermore proposed that the main part comprises two side walls which each have at least four slots in a region of the plateau. As a result, the main part can be designed particularly advantageously in a material saving manner, wherein a required stability is kept intact. A "side wall" refers in this context particularly to a wall which delimits the main part in the wiping direction.

It is furthermore proposed that the main part comprises at least one side wall which has at least one open slot in a region of the plateau, which slot is delimited in the main extension thereof from the closed side thereof up to the open side thereof by a single, at least substantially rectilinear contour line. In so doing, the main part can be produced particularly advantageously or, respectively, be designed particularly advantageously. An "open slot" refers in this context particularly to a slot which has an open contour and does not form a self-contained contour line. "At least substantially" refers in this context particularly to a deviation from a rectilinear contour which amounts preferably to less than 10 degrees, more preferably less than 5 degrees and most preferably less than 1 degree. A "contour line" refers particularly to an outside edge of a slot as viewed from the wiping direction, which outside edge delimits the slot towards the outside in one direction.

BRIEF DESCRIPTION OF THE DRAWINGS

Additional advantages ensue from the following description of the drawings. An exemplary embodiment of the invention is depicted in the drawings. The drawings, the description and the claims contain numerous features in combination. The person skilled in the art will expediently consider the features individually and put them together to form further useful combinations.

In the drawings.

DETAILED DESCRIPTION

Figure 1:
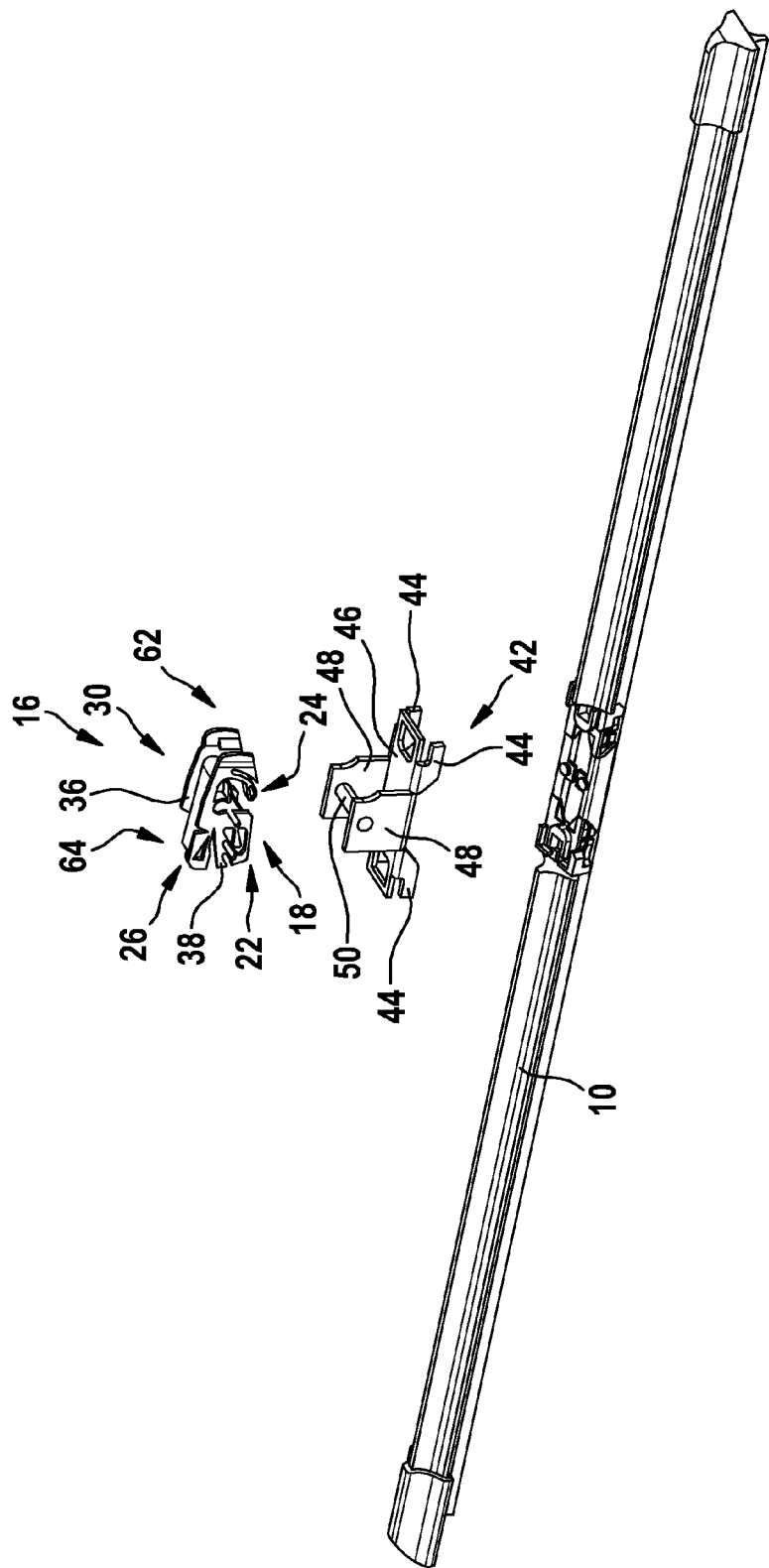
FIG. 1 shows a wiper system according to the invention, comprising a wiper blade and a wiper blade adapter unit.
Figure 2:
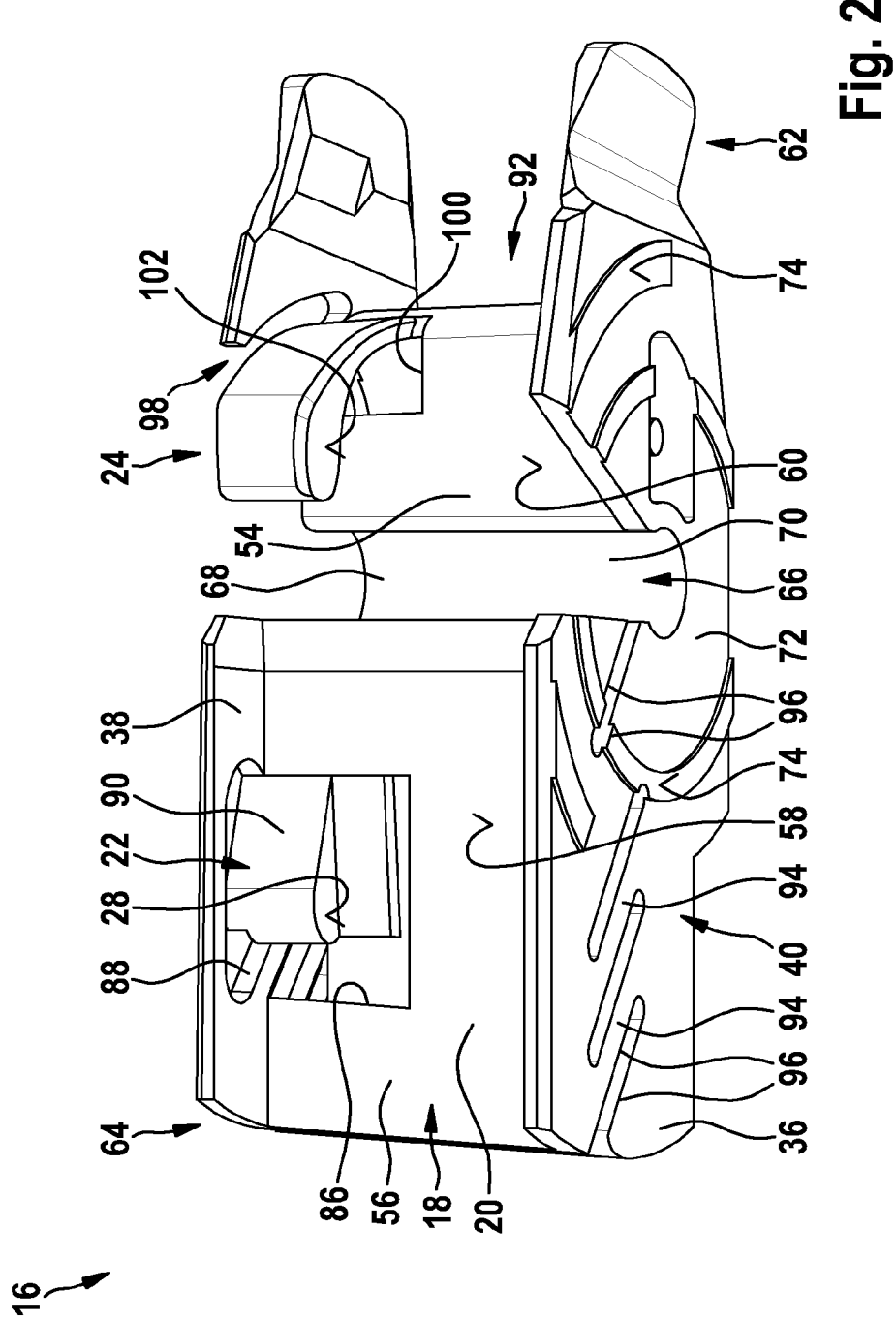
FIG. 2 shows a main part of the wiper blade adapter unit according to the invention as viewed from below.
Figure 3:
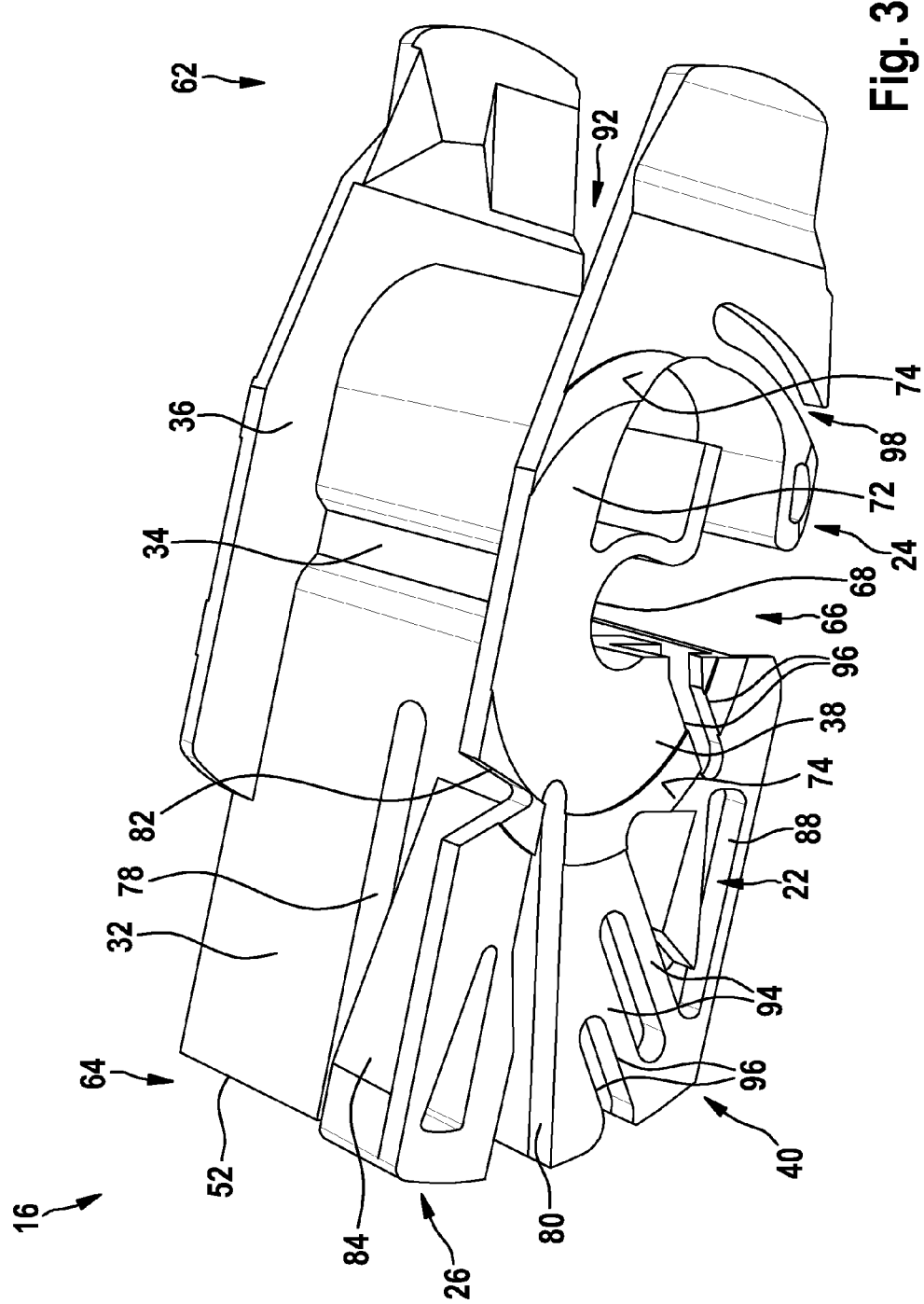
FIG. 3 shows a main part of the wiper blade adapter unit according to the invention as viewed from above and FIG. 4 shows the main part of the wiper blade adapter unit according to the invention, comprising a wiper arm adapter in an assembled state.
Figure 4:
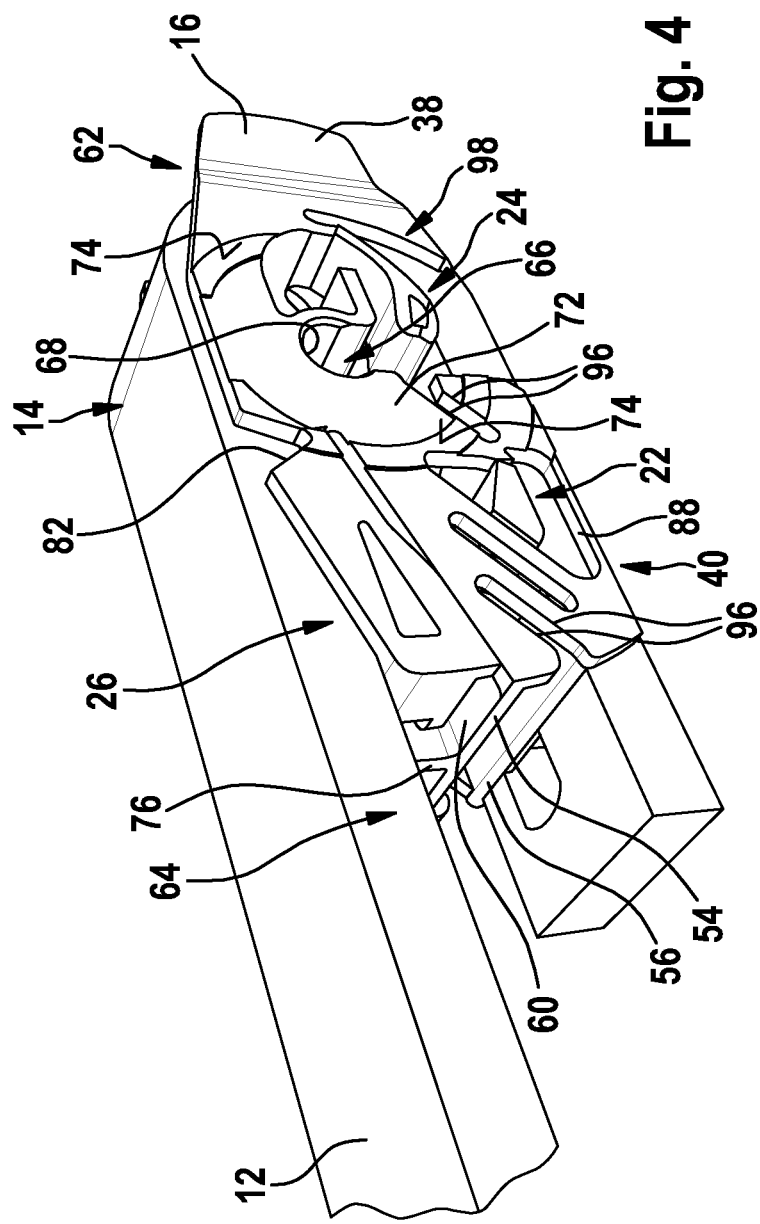

FIG. 1 shows a wiper system comprising a wiper blade adapter unit according to the invention. The wiper system further comprises a wiper arm adapter 12 and a wiper blade 10, which is provided to wipe an unspecified pane of a passenger motor vehicle or a commercial vehicle. The wiper arm adapter 12 is hook-shaped, wherein one end 14 of the wiper arm adapter 12 has a bend that is bent about an angle of 180 degrees. Depending on the type of embodiment of the wiper arm adapter 12, the bend can have various radii and lengths. A thickness of the wiper arm adapter 12 is likewise variable. The wiper arm adapter 12 is fixedly connected to a wiper arm of the passenger or commercial vehicle that is not depicted in detail. It is also conceivable in principle that the wiper arm adapter 12 is embodied as one piece with the wiper arm. At an end facing away from the bend, the wiper arm or wiper arm adapter 12 is connected to a wiper motor which is not depicted in detail, via which motor the wiper system can be driven.

The wiper blade adapter unit is provided to connect the wiper blade 10 to the wiper arm adapter 12. To this end, the wiper blade adapter unit comprises a first element 42 which receives and supports the wiper blade 10. The first element 42 comprises four detent elements 44, by means of which the element 42 can be fixedly connected to the wiper blade 10 via a positive-locking connection. It is also thereby conceivable in principle that the element 42 has further or differently configured connecting elements by means of which the first element 42 can be fixedly connected to the wiper blade 10 via a positive-locking, frictional and/or materially bonded connection. The element 42 comprises a base plate 46, a side wall 48 being mounted in each case to the sides thereof along a main extension direction of said base plate 46. The side walls 48 are connected to a cylindrical axis 50 so as to be spaced apart from said base plate 46.

The wiper blade adapter unit further comprises a main part 16 which can be fastened to the first element 42 via the cylindrical axis 50. The main part 16 is provided in particular to receive the end 14 of the wiper arm adapter 12. The main part 16 substantially consists of a hollow body comprising two side walls 36, 38 which laterally delimit an upper transverse wall, a middle transverse wall 54 and a lower transverse wall 56 of an upper abutment surface 32, a middle surface 60 and a lower abutment surface 58. In so doing, the side walls 36, 38 extend outward on the top and bottom from the transverse walls 52, 56 or, respectively, the abutment surfaces 32, 58 of the main part 16. The main part 16 comprises three regions 22, 24, 26 designed in a flexible manner, which are provided for the purpose of a shape and/or tolerance compensation. The regions 22, 24, 26 of the main part 16 that are designed in a flexible manner are embodied as resilient lugs.

In one mounting position on the wiper arm adapter 12, the main part 16 has a front end 62 facing away from the wiper motor, the side walls 36, 38 tapering in the direction of said front end. The main part 16 further has a back end 64 facing the wiper motor, a lower face 18 facing the wiper blade 10 and an upper face 30 that faces away from the wiper blade 10 and faces the wiper arm adapter 12.

The main part 16 has a continuous transverse groove 66 on the lower face 18 thereof, which groove extends from the side wall 36 up to the other side wall 38. The transverse groove 66 forms a triangular recess 68 in each of the side walls 36, 38, said recess 68 merging in each case into a circular recess 68. The transverse groove 66 extends up to the upper transverse wall 52. A groove base, which is disposed on the upper transverse wall 52, forms a hollow cylinder 70 which is provided to engage over the cylindrical axis 50 of the first element 42. The main part 16 is fixedly connected to the first element 42 and therefore to the wiper blade 10 via a positive-locking connection between the hollow cylinder 70, which is formed by the groove base of the transverse groove 66, and the cylindrical axis 50 of the first element 42. The main part 16 has a pocket 34 which is introduced into the abutment surface 32 on the upper face 30 thereof and extends in a wiping direction. In so doing, the pocket 34 is situated directly above the transverse groove 66 on the side of the upper transverse wall 52 facing away from the groove base. Elevated annular abutment surfaces 74 are situated in each case on outer faces 72 of the side walls 36, 38, said abutment surfaces are disposed in each case concentrically with respect to a center of the corresponding circular recesses 68.

Between the side walls 36, 38, the upper transverse wall 52 and the middle transverse wall 54 are connected by a supporting wall 76 which extends parallel to said side walls 36, 38. The upper transverse wall 52 comprises an elongated recess 78 along the supporting wall 76. The upper and the middle transverse wall 52, 54 form together with the left side wall 36 a hollow section having a rectangular cross section. The right side wall 38 comprises a wedge-shaped recess 80 that opens to the back end 64 in a region of the elongated recess 78. The wedge-shaped recess 80 extends from the back end 64 up close to the circular recess 68. The right side wall 38 comprises a wedge-shaped notch 82 at one end of the wedge-shaped recess 80 which faces away from the back end 64 of the main part 16. The wedge-shaped recess 82 opens in the direction of the upper face 30 and begins at a contact point of the side wall 38 to the upper abutment surface 32. As a result, the first flexibly designed region 26 which is L-shaped as viewed from the back end 64 is formed. The flexibly designed region 26 is embodied as a resilient lug. A wedge-shaped projection 84, which rises up in the direction of the back end 64 of the main part 16, is integrally formed on the region 26 embodied as a resilient lug 26 on a side of the right side wall 38 facing the elongated recess 78. The wedge-shaped projection forms a first lateral abutment surface for the wiper arm adapter 12.

The main part 16 forms a plateau 20 on the lower face 18 thereof. The plateau 20 is formed by the lower transverse wall 56 which comprises the lower abutment surface 58. The plateau 20 extends from the back end 64 of the main part 16 up to the transverse groove 66. The region 22 designed in a flexible manner for the purpose of a shape and/or tolerance compensation is arranged within the plateau 20. The flexibly designed region 22 arranged within the plateau 20 is embodied as a resilient lug. An L-shaped groove 86 is introduced into the abutment surface 58 of the lower transverse wall 56 in order to form the flexible region 22. In so doing, one side of the L-shaped groove 86 is parallel to the side walls 36, 38 and faces the left side wall 36, and a second side located at a right angle to the first side of the groove 86 faces the back end 64 of the main part 16. The second side of the groove 86 thereby extends from the first side of the groove 86 up to the right side wall 38. In one region of the L-shaped groove 86, a triangular recess 88 is introduced into the right side wall 38, said recess extending from the middle transverse wall 54 almost up to a lower end of the right side wall 38. The flexibly designed region 22 is formed by the L-shaped groove 86 and the triangular recess 88 in the right side wall 38. The flexibly designed region 22, which is embodied as a resilient lug, is connected to the lower transverse wall 56, which forms the plateau 20, on a side facing the front end 62 of the main part 16. A wedge-shaped projection 90, which rises up in the direction of the back end 64 of the main part 16, is integrally formed on the flexible region 22 that is embodied as a resilient lug on a side of the right side wall 38 facing the L-shaped groove 86. The wedge-shaped projection 90 constitutes a first lateral abutment surface 26 which forms a stop for a wiper arm adapter 12.

The side walls 36, 38 of the main part 16 comprise in each case four slots 40 in a region of the plateau 20. The slots 40 are formed in such a way that the side walls 36, 38 form thin, leaf spring-like, oblique webs 94 in a region of the plateau 20 between the lower transverse wall 56 and the middle transverse wall 54. As a result, each of the side walls 36, 38 has respectively an open slot 40 which is delimited at least substantially by two individual, rectilinear contour lines 96 in the main extension direction thereof from the closed side thereof up to the open side thereof, which open side is arranged on the back end 64 of the main part 16. Each of the side walls 36, 38 further has respectively an open slot 40 which is delimited at least substantially by the two individual, rectilinear contour lines 96 in the main extension direction thereof from the closed side thereof up to the open side thereof, which open side is arranged in the transverse groove 66 of the main part 16. One of the four slots 40 is widened towards the triangular recess 88 in the right side wall 38 in order to form the flexibly designed region 22.

The upper abutment surface 32 is connected via a radius 92 to the middle surface 60 at the front end 62 of the main part 16. In addition to the flexibly designed region 22 arranged within the plateau 20, a second flexibly designed region 24 is arranged on the lower face 18 of the main part 16. The second flexibly designed region 24 is arranged on the radius 92 of the main part 16. The second flexibly designed region 24 is embodied as a resilient lug which projects above the plateau 20 in a direction oriented away from an upper face 30 of the main part 16. The right side wall 38 comprises a curved recess 98 which starts at the middle transverse wall 54 and is open in a downward direction. An L-shaped recess 100 is disposed in a transition from the radius 92 to the middle surface 60. The flexibly designed region 24 which is embodied as a resilient lug comprises an abutment surface 102 which faces the left side wall 36 and forms a stop for the wiper arm adapter 12.

In the following, an attachment of wiper arm adapters 12 which have different dimensions is to be briefly described. If the wiper arm adapter 12 has a width which corresponds to the distance between the left side wall 36 and the abutment surfaces 28, 102 of the flexibly designed regions 22, 24, the wiper arm adapter 12 rests against the side wall 36 and the abutment surfaces 28, 102 of the flexibly designed regions 22, 24, 26 in an assembled state and is thereby fixed and centered. Depending on the radius of the bend in the wiper arm adapter 12, an angled piece of the wiper arm adapter 12 can reach either between the middle transverse wall 54 and the lower transverse wall 56 or come into contact below the lower abutment surface 58 of the lower transverse wall 56. If the width of the wiper arm adapter is wider than the distance between the left side wall 36 and the abutment surfaces 28, 102 of the flexibly designed regions 22, 24, in particular as wide as a distance between the two side walls 36, 38, the flexibly designed regions 22, 24, 26 are depressed when mounting the wiper arm adapter 12. In order to fix the wiper arm adapter 12 in the main part 16, a cover, which is not depicted in detail, is folded over the main part and latched so that the wiper arm adapter 12 is fixedly and captively connected to the wiper blade 10 after assembly.

What is claimed is:

1. A wiper blade adapter unit for connecting a wiper blade (10) to a wiper arm adapter (12), comprising a main part (16) which receives an end (14) of the wiper arm adapter (12) and which has a plateau (20) on a main part lower face (18), wherein at least one region (22, 24, 26) is provided on the main part (16), which at least one region is designed in a flexible manner for the purpose of at least one of shape compensation and tolerance compensation, characterized in that the at least one region (22, 24, 26) includes a region (22) that is arranged within the plateau (20), wherein the region (22) includes a flexible resilient lug, wherein the main part lower face (18) includes a lower abutment surface (58) configured to contact the wiper arm adapter (12), and wherein the flexible resilient lug is movable relative to the lower abutment surface (58), wherein a second flexibly designed region (24) is arranged on the lower face (18) of the main part (16) in addition to the flexibly designed region (22) arranged within the plateau (20), wherein the flexibly designed region (24) arranged on the lower face (18) of the main part (16) is embodied as a resilient lug which projects above the plateau (20) in a direction that is oriented away from an upper face (30) of the main part (16).

2. The wiper blade adapter unit according to claim 1, characterized in that the region (22) embodied as a resilient lug comprises at least one abutment surface (28) which forms a stop for the wiper arm adapter (12).

3. The wiper blade adapter unit according to claim 2, characterized in that the main part (16) has an upper abutment surface (32) on the upper face (30), the upper abutment surface having therein a pocket (34) which extends at least substantially in a wiping direction.

4. The wiper blade adapter according to claim 3, characterized in that the main part (16) comprises two side walls (36, 38) which each have at least four slots (40) in a region of the plateau (20).

5. The wiper blade adapter unit according to claim 4, characterized in that the main part (16) comprises at least one side wall (36, 38) which has at least one open slot (40) in a region of the plateau (20), said slot being at least substantially delimited in a main extension thereof from a closed side thereof up to an open side thereof by a single, at least substantially rectilinear contour line (96).

6. The wiper blade adapter unit according to claim 1, characterized in that the main part (16) has an upper abutment surface (32) on the upper face (30), the upper abutment surface having therein a pocket (34) which extends at least substantially in a wiping direction.

7. The wiper blade adapter according to claim 1, characterized in that the main part (16) comprises two side walls (36, 38) which each have at least four slots (40) in a region of the plateau (20).

8. The wiper blade adapter unit according to claim 1, characterized in that the main part (16) comprises at least one side wall (36, 38) which has at least one open slot (40) in a region of the plateau (20), said slot being at least substantially delimited in a main extension thereof from a closed side thereof up to an open side thereof by a single, at least substantially rectilinear contour line (96).

9. The wiper blade adapter unit according to claim 1, wherein the main part (16) includes two side walls (36, 38), wherein the lower abutment surface (58) extends between the two side walls (36, 38), and wherein the flexible resilient lug is closer to one of the two side walls than the other side wall.

10. The wiper blade adapter unit according to claim 9, wherein the flexible resilient lug includes at least one side abutment surface (28), and wherein the at least one side abutment surface (28) faces toward one of the two side walls (36, 38).

11. The wiper blade adapter unit according to claim 9, wherein the region (22) is a first region and the resilient flexible lug is a first resilient flexible lug, and wherein the at least one region (22, 24, 26) includes a second region (24) that includes a second resilient flexible lug that is closer to one of the two side walls than the other side wall.

12. The wiper blade adapter unit according to claim 11, wherein the at least one side abutment surface (28) is a first side abutment surface, wherein the second flexible resilient lug includes a second side abutment surface (102), and wherein the second side abutment surface (102) also faces one of the two side walls (36, 38).

13. The wiper blade adapter unit according to claim 1, wherein the lower abutment surface (58) defines an L-shaped groove (86) that extends at least partially around the resilient flexible lug.

14. The wiper blade adapter unit according to claim 1, wherein the at least one region (22, 24, 26) includes three flexible resilient lugs.

15. The wiper blade adapter unit according to claim 1, wherein a side wall (36) extends from the lower abutment surface (58), and wherein the flexible resilient lug includes at least one side abutment surface (28) which faces toward the side wall (36), such that when the wiper arm adapter (12) has a first width, the wiper arm adapter (12) is configured to press the flexible resilient lug in a direction toward the lower abutment surface (58), and when the wiper arm adapter (12) has a second, smaller width, the wiper arm adapter (12) is configured to be disposed between the side abutment surface (28) and the side wall (36), without pressing the flexible resilient lug in the direction toward the lower abutment surface (58).

16. A wiper blade adapter unit for connecting a wiper blade (10) to a wiper arm adapter (12), comprising a main part (16) which receives an end (14) of the wiper arm adapter (12) and which has a plateau (20) on a main part lower face (18), wherein at least one region (22, 24, 26) is provided on the main part (16), which at least one region is designed in a flexible manner for the purpose of at least one of shape compensation and tolerance compensation, characterized in that the at least one region (22, 24, 26) includes a region (22) that is arranged within the plateau (20), wherein the region (22) includes a flexible resilient lug, wherein the main part lower face (18) includes a lower abutment surface (58) configured to contact the wiper arm adapter (12), wherein the flexible resilient lug is movable relative to the lower abutment surface (58), wherein the main part (16) includes two side walls (36, 38), wherein the lower abutment surface (58) extends between the two side walls (36, 38), wherein the flexible resilient lug is closer to one of the two side walls than the other side wall, wherein the flexible resilient lug includes at least one side abutment surface (28), and wherein the at least one side abutment surface (28) faces toward one of the two side walls (36, 38).

17. The wiper blade adapter unit according to claim 16, characterized in that the region (22) embodied as a resilient lug comprises at least one abutment surface (28) which forms a stop for the wiper arm adapter (12).

18. A wiper blade adapter unit for connecting a wiper blade (10) to a wiper arm adapter (12), comprising a main part (16) which receives an end (14) of the wiper arm adapter (12) and which has a plateau (20) on a main part lower face (18), wherein at least one region (22, 24, 26) is provided on the main part (16), which at least one region is designed in a flexible manner for the purpose of at least one of shape compensation and tolerance compensation, characterized in that the at least one region (22, 24, 26) includes a region (22) that is arranged within the plateau (20), wherein the region (22) includes a flexible resilient lug, wherein the main part lower face (18) includes a lower abutment surface (58) configured to contact the wiper arm adapter (12), and wherein the flexible resilient lug is movable relative to the lower abutment surface (58), wherein the main part (16) includes two side walls (36, 38), wherein the lower abutment surface (58) extends between the two side walls (36, 38), wherein the flexible resilient lug is closer to one of the two side walls than the other side wall, wherein the region (22) is a first region and the resilient flexible lug is a first resilient flexible lug, and wherein the at least one region (22, 24, 26) includes a second region (24) that includes a second resilient flexible lug that is closer to one of the two side walls than the other side wall.

19. The wiper blade adapter unit according to claim 18, characterized in that the at least one side abutment surface (28) is a first side abutment surface, wherein the second flexible resilient lug includes a second side abutment surface (102), and wherein the second side abutment surface (102) also faces one of the two side walls (36, 38).

* * * * *